United States Patent
Daniel et al.

(10) Patent No.: US 12,461,533 B2
(45) Date of Patent: Nov. 4, 2025

(54) METHOD FOR DETERMINING A DISTANCE BETWEEN A CLEANING ROBOT AND AN OBSTACLE

(71) Applicant: BSH Hausgeräte GmbH, Munich (DE)

(72) Inventors: Kristina Daniel, Bad Neustadt (DE); Kai Schmitt, Saal (DE); Frank Schnitzer, Bad Neustadt (DE)

(73) Assignee: BSH Hausgeräte GmbH, Munich (DE)

( * ) Notice: Subject to any disclaimer, the term of this patent is extended or adjusted under 35 U.S.C. 154(b) by 386 days.

(21) Appl. No.: 18/040,678

(22) PCT Filed: Jul. 20, 2021

(86) PCT No.: PCT/EP2021/070248
§ 371 (c)(1),
(2) Date: Feb. 6, 2023

(87) PCT Pub. No.: WO2022/028876
PCT Pub. Date: Feb. 10, 2022

(65) Prior Publication Data
US 2023/0288940 A1 Sep. 14, 2023

(30) Foreign Application Priority Data
Aug. 5, 2020 (DE) .................. 10 2020 209 843.3

(51) Int. Cl.
*G05D 1/00* (2024.01)
*G06T 7/20* (2017.01)
*G06T 7/50* (2017.01)

(52) U.S. Cl.
CPC ......... *G05D 1/0231* (2013.01); *G05D 1/0238* (2013.01); *G05D 1/0253* (2013.01);
(Continued)

(58) Field of Classification Search
CPC .. G05D 1/0231; G05D 1/0238; G05D 1/0253; G06T 7/20; G06T 7/50;
(Continued)

(56) References Cited

U.S. PATENT DOCUMENTS

| | | | |
|---|---|---|---|
| 6,124,694 A * | 9/2000 | Bancroft | G05D 1/0272 318/587 |
| 10,422,648 B2 * | 9/2019 | Afrouzi | G01C 21/30 |
| 2018/0249872 A1 | 9/2018 | Park | |

FOREIGN PATENT DOCUMENTS

| | | |
|---|---|---|
| DE | 102008014912 A1 | 9/2009 |
| EP | 3002609 A1 | 4/2016 |
| WO | 2019238958 A1 | 12/2019 |

* cited by examiner

*Primary Examiner* — Bao Long T Nguyen
(74) *Attorney, Agent, or Firm* — Laurence A. Greenberg; Werner H. Stemer; Ralph E. Locher

(57) ABSTRACT

A method for determining a distance between a cleaning robot and an obstacle. The cleaning robot has a first distance measuring system for a far measuring range and a second distance measuring system for a near measuring range. The second distance measuring system includes a camera. a) if the obstacle is located in the far measuring range, the distance between the cleaning robot and the obstacle is determined by way of the first distance measuring system. b) if the obstacle is located in an overlap region of the far measuring range and the near measuring range, the distance between the cleaning robot and the obstacle is determined by way of the first and the second distance measuring systems; c) if the obstacle is located in the near measuring range, the distance between the cleaning robot and the obstacle is determined by way of the second distance measuring system.

10 Claims, 4 Drawing Sheets

(52) U.S. Cl.
CPC ................... *G06T 7/20* (2013.01); *G06T 7/50* (2017.01); *G06T 2207/10016* (2013.01); *G06T 2207/30261* (2013.01)

(58) Field of Classification Search
CPC .......... G06T 2207/10016; G06T 2207/30261; G01C 3/08; G01S 7/497; G01S 17/48; G01S 17/86; G01S 17/88; G01S 17/931; A47L 2201/04; A47L 9/2805
See application file for complete search history.

METHOD FOR DETERMINING A DISTANCE BETWEEN A CLEANING ROBOT AND AN OBSTACLE

FIELD AND BACKGROUND OF THE INVENTION

With cleaning robots, methods for determining a distance between such a cleaning robot and an obstacle have been applied for some time. Conventional cleaning robots designed to carry out such a method typically comprise distance measuring systems, by means of which the distance between the cleaning robot and the obstacle can be determined on the basis of optoelectronic distance measurement—e.g. laser triangulation, runtime measurement, phase difference measurement—using a stereo camera or ultrasound sensors. Alternatively or in addition, cleaning robots are frequently equipped with tactile sensors which detect contact between the cleaning robot and an obstacle on the basis of a zero distance.

Comparatively high costs of implementation on the one hand and design-specific imprecisions of a measuring range of the respective distance measuring system on the other hand have proven to be disadvantageous in the case of said typically used contactless distance measuring systems, e.g. optoelectronic distance measurement, stereo camera and/or ultrasound sensors. One disadvantage with contact-making distance measuring systems is brought about in that such physical contact between the cleaning robot and the obstacle is required in order to detect the zero distance. This brings about negative effects such as abrasion, wear and contamination either of the cleaning robot or the obstacle or both. An object of the present invention is therefore to display new ways for methods for determining a distance between a cleaning robot and an obstacle, in particular in order to eliminate the disadvantages shown above.

SUMMARY OF THE INVENTION

This object is achieved by the method as claimed. Preferred embodiments are the subject matter of the dependent claims.

The basic idea behind the invention is to realize a method for determining a distance between a cleaning robot and an obstacle, wherein the cleaning robot comprises two distance measuring systems which differ from one another, of which one supplies reliable measuring results for the actual distance between the cleaning robot and the obstacle in a remote measuring range and the other in a close measuring range. Here a second of the two distance measuring systems, which is designed to measure the distance in the close measuring range, comprises a camera directed at the obstacle. A distance between the cleaning robot and the obstacle can therefore advantageously also be determined precisely in a close measuring range by means of the inventive method, wherein a camera already provided on the cleaning robot can be used to map a surface to be cleaned by the cleaning robot. This involves cost advantages since it is possible to dispense with additional sensor systems by using synergies.

An inventive method for determining a distance between a cleaning robot and an obstacle can preferably be used to prevent the cleaning robot from colliding with the obstacle. The cleaning robot, which is designed to carry out the method, has a first distance measuring system which is designed to measure the distance in a predetermined remote measuring range. Moreover, the cleaning robot has a second distance measuring system which differs from the first and is designed to measure the distance in a predetermined close measuring range. This second distance measuring system of the cleaning robot comprises a camera directed at the obstacle. In this way the close measuring range is a distance range nearby and the remote measuring range is a distance range which is distanced from the cleaning robot. The close measuring range can therefore extend directly away from the cleaning robot, whereas a distance is present between an end of the remote measuring range facing the cleaning robot and the cleaning robot. The remote measuring range and the close measuring range can therefore be arranged graduated in the manner of a shell segment. The close and the remote measuring range overlap in an overlap region. In this overlap region, the distance between the cleaning robot and the obstacle can be reliably measured both by means of the first and also by means of the second distance measuring system. Here the method comprises three measures a), b) and c). Measure a) provides that the distance between the cleaning robot and the obstacle is determined at least by means of the first distance measuring system, if the obstacle is located within the remote measuring range. According to measure b) of the method, the distance between the cleaning robot and the obstacle is determined by means of the first and the second distance measuring system, provided the obstacle is located in the overlap region. With measure c) of the method, in the case where the obstacle is located in the close measuring range, the distance between the cleaning robot and the obstacle is determined by means of at least the second distance measuring system. Advantageously, it is therefore achieved by means of the method that a reliable determination of the actual distance between the cleaning robot and the obstacle is possible both in the remote measuring range and also in the close measuring range, wherein to this end a camera is used to determine the distance in the close measuring range, said camera possibly already comprising the cleaning robot for mapping a surface to be cleaned by the cleaning robot. This means that by means of the method the distance between the cleaning robot and the obstacle is also enabled in the close measuring range without significant additional costs.

According to an advantageous development of the method, in measures a) and b) the distance between the cleaning robot and the obstacle in the remote measuring range is determined by means of the first distance measuring system using optoelectronic distance measurement. A first distance measuring system based especially on laser triangulation delivers particularly reliable distance measuring results in the remote measuring range.

With a further preferred development of the method, in measures b) and c) an optical flow of an image sequence detected by means of the camera of the second distance measuring system is determined and evaluated in order to determine the distance between the cleaning robot and the obstacle. This offers a particularly precise possibility of determining the distance between the cleaning robot and the obstacle by means of the camera.

With a further advantageous development of the method, provision is made in measure c) for the optical flow to be determined and evaluated continuously in order to determine the distance between the cleaning robot and the obstacle. In this way the optical flow is preferably determined and evaluated continuously by assuming an almost constant velocity of the cleaning robot in order to determine the distance between the cleaning robot and the obstacle. This advantageously permits a particularly reliable determination of the distance between the cleaning robot and the obstacle.

Possible variations in a velocity of the cleaning robot which are determined by way of a wheel speed of wheels of the cleaning robot as a result of slippage therefore have no effect on the distance measurement in the close measuring range.

According to a further preferred development of the method, at least one striking pixel is traced when the optical flow of the image sequence is determined and evaluated. This striking pixel moves in the image sequence along a flow vector with a flow vector length. This offers a possibility which is particularly simple to implement in order to determine the optical flow of the image sequence.

A further preferred development of the method provides that a shared end of the close measuring range and the overlap region which is close to the obstacle is defined by means of a calibration distance. Here this calibration distance is determined by means of the first distance measuring system in measure a). In this way, it is advantageously achieved that an accurate determination of the distance between the cleaning robot and the obstacle is enabled across the entire distance measuring range, in other words both in the close and also remote measuring range and in the overlap region.

According to a further advantageous development of the method, if the cleaning robot passes over the end of the close measuring range near to the obstacle and of the overlap region in the direction of the obstacle, by introducing measure b), a calibration of the flow vector length with the calibration distance determined by means of the first distance measuring device in measure a) is carried out. Advantageously, it can therefore be ensured particularly reliably that once the cleaning robot is located outside of the remote measuring range, accurate values of the distance between the cleaning robot and the obstacle can be determined by means of the second distance measuring system in the close measuring range.

According to a further preferred development of the method, the second distance measuring system is inactive in measure a). In measure c), the first distance measuring system is inactive. In measure b), both the first and also the second distance measuring system are active. An unnecessary energy consumption of one of the distance measuring systems is therefore avoided, if the obstacle is located in a distance from the cleaning robot, which is settled outside of the measuring range which can be reliably monitored by the respective inactivated distance measuring system.

With an advantageous development of the method, the remote measuring range corresponds to an interval of 30 mm to 200 mm of the distance between the cleaning robot and the obstacle. In this interval, the first distance measuring system operates in a particularly precise and reliable manner.

According to a further advantageous development of the method, the close measuring range corresponds to an interval of 0 mm to 50 mm of the distance between the cleaning robot and the obstacle. In this interval, the distance between the cleaning robot and the obstacle can be determined in a particularly reliable and precise manner by means of the second distance measuring system.

Further important features and advantages of the invention become apparent from the subclaims, from the drawings and from the associated description of the figures using the drawings.

It is apparent that the previously cited features which are also still to be explained below can be used not only in the respectively specified combination, but also in other combinations or alone without departing from the scope of the present invention Preferred exemplary embodiments of the invention are shown in the drawings and are explained in more detail in the description below, wherein the same reference characters relate to identical or similar or functionally identical components.

DETAILED DESCRIPTION OF THE INVENTION

Figure 1:
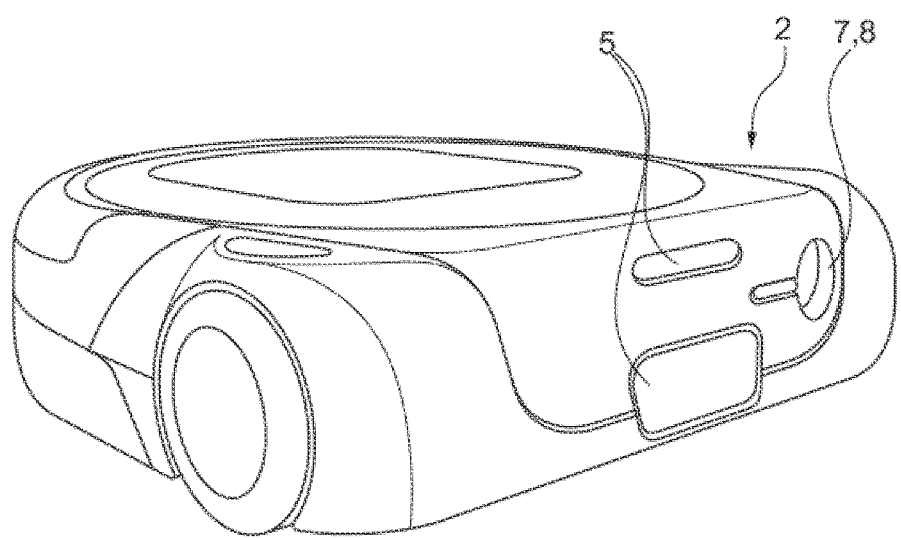
FIG. 1 by way of example a cleaning robot, which is designed to carry out an inventive method, FIG. 2a by way of example a snapshot while the inventive method is being carried out, FIG. 2b a further exemplary snapshot while the inventive method is being carried out, FIG. 3a by way of example an image of an image sequence which is recorded by means of a camera of the cleaning robot while the inventive method is being carried out, FIG. 3b by way of example a further image of the image sequence which is recorded by means of the camera of the cleaning robot while the inventive method is being carried out, FIG. 3c by way of example a determination of an optical flow of the image sequence from the images in FIGS. 3a and 3b while the inventive method is being carried out, FIG. 4 a flowchart which illustrates the inventive method by way of example.

A cleaning robot 2 is shown by means of example in a perspective representation in FIG. 1, said cleaning robot being designed to carry out an inventive method 1 for determining a distance A between the cleaning robot 2 and an obstacle 3. The cleaning robot 2 has a first distance measuring system 5 and a second distance measuring system 7 with a camera 8 which differs from the first. The first distance measuring system 5 is expediently based on laser triangulation.

Figure 2A:
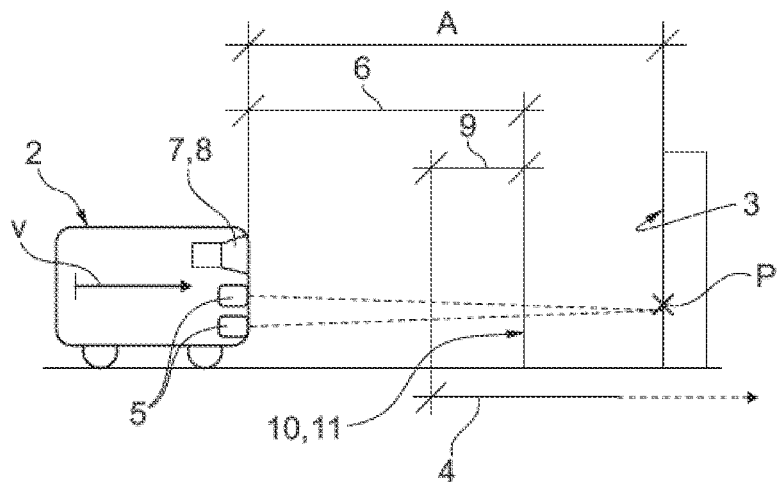

In FIG. 2a, a snapshot of the cleaning robot 2 and the obstacle 3 is shown in a rough schematic manner while the inventive method 1 is being carried out. The first distance measuring system 5 of the cleaning robot 2 is designed to measure the distance in a predetermined remote measuring range 4. The second measuring system 7 of the cleaning robot 2 which differs from the first is designed to measure the distance in a predetermined close measuring range 6. In this way the close measuring range 6 is a distance range nearby and the remote measuring range 4 is a distance range which is distanced from the cleaning robot 2. The close measuring range 6 can therefore extend directly away from the cleaning robot 2, whereas a distance is present between an end of the remote measuring range 4 facing the cleaning robot 2 and the cleaning robot 2. The remote measuring range 4 and the close measuring range 6 can therefore be arranged graduated in the manner of a shell segment. The camera 8 of the second distance measuring system 7 is directed at the obstacle 3. It is apparent that the close and remote measuring range 6, 4 overlap in an overlap region 9. In this overlap region 9, the distance between the cleaning robot 2 and the obstacle 3 can be reliably measured both by means of the first and also by means of the second distance measuring system 5, 7.

Figure 4:
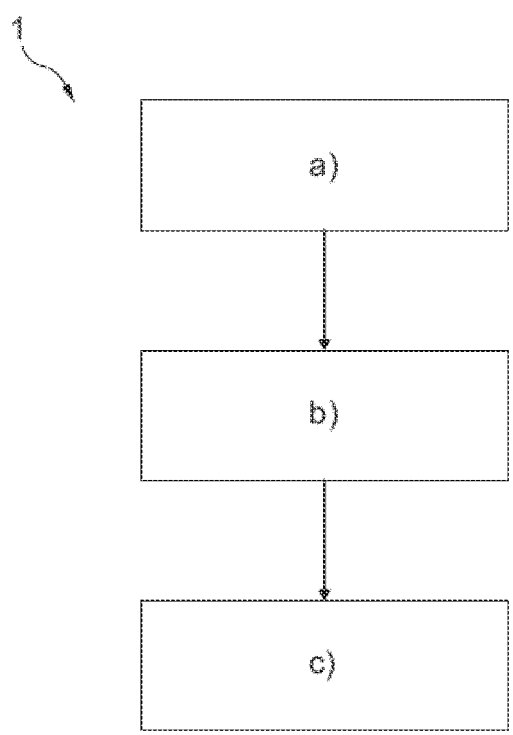

FIG. 4 illustrates the inventive method 1 by means of a flowchart, by way of example. It is apparent that the method 1 comprises three measures a), b) and c). According to measure a) of the method 1, the distance A between the cleaning robot 2 and the obstacle 3 is determined at least by means of the first distance measuring system 5, if the obstacle 3 is located within the remote measuring range 4. With measure b), the distance A between the cleaning robot 2 and the obstacle 3 is determined by means of the first and the second distance measuring system 5, 7, if the obstacle 3 is located within the overlap region 9. According to measure c) of the method 1, the distance A between the cleaning robot 2 and the obstacle 3 is determined by means of at least the second distance measuring system 7 of the cleaning robot 2, if the obstacle 3 is located within the close measuring range 6. In the snapshot shown in FIG. 2a, the obstacle 3 is located in the remote measuring range 4 and outside of the overlap region 9 while the method 1 is being carried out. Therefore, in FIG. 2a, the distance A between the cleaning robot 2 and the obstacle 3 is determined by means of the first distance measuring system 5, since the condition of measure a) of the method 1 is fulfilled and the condition of measures b) and c) of method 1 are not fulfilled. In the example shown, the distance A between the cleaning robot 2 and the obstacle 3 is determined by means of the first distance measurement 5 in the remote measuring range 4 by means of laser triangulation. Both in measure a) and also in measure b), the distance A between the cleaning robot 2 and the obstacle 3 is therefore determined in the remote measuring range 4 by means of the first distance measuring system 5 using laser triangulation.

Figure 2B:
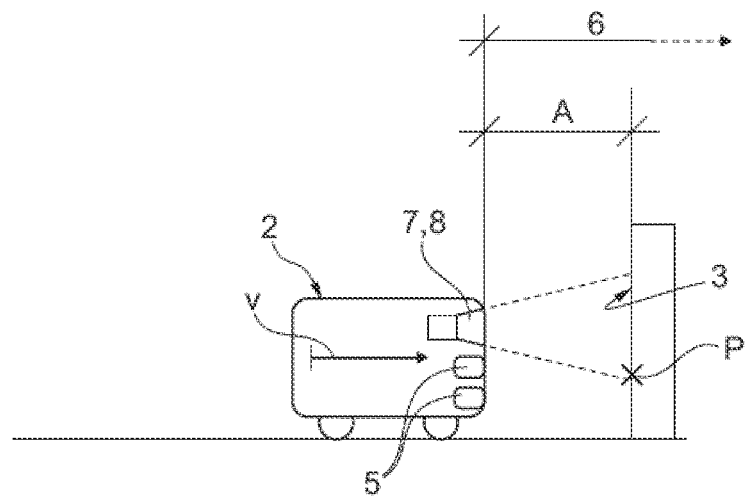

The snapshot illustrated in FIG. 2b while the method 1 is being carried out reveals that the obstacle 3 is now located in the close measuring range 6. The condition of measure c) of the inventive method 1 is therefore fulfilled in FIG. 2b. Accordingly, in the example shown the distance A between the cleaning robot 2 and the obstacle 3 is determined by means of the second distance measuring system 7. In measures b) and c) an optical flow of an image sequence detected by means of the camera 8 of the second distance measuring system 7 is determined and evaluated in order to determine the distance A between the cleaning robot 2 and the obstacle 3.

Figure 3A:
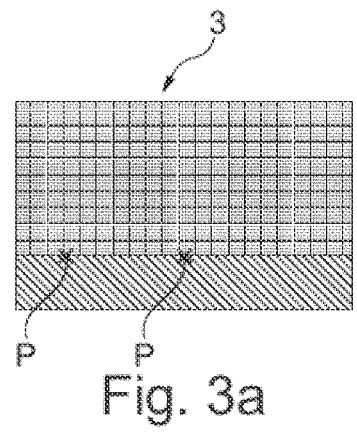
Figure 3B:
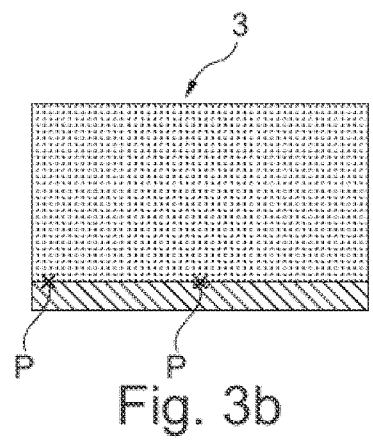

FIGS. 3a and 3b in each case show in the manner of a snapshot images of the image sequence captured by means of the camera 8 of the second distance measuring system 7 in measures b) and c).

Figure 3C:
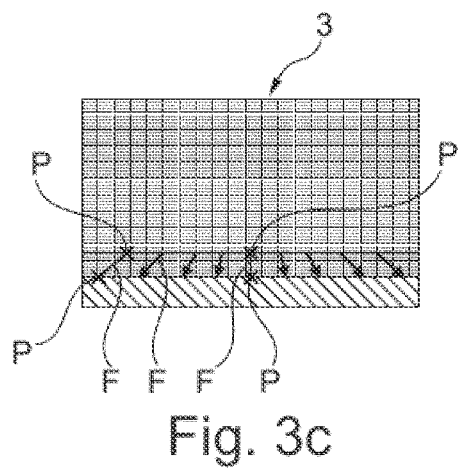

The determination and evaluation of the optical flow of the image sequence is illustrated by way of example in FIG. 3c. In this way, in measure c), the optical flow is determined and evaluated continuously for instance by assuming an almost constant velocity v of the cleaning robot 2 in order to determine the distance A between the cleaning robot 2 and the obstacle 3. FIG. 3c therefore also shows just one snapshot when the image sequence is determined or evaluated. To this end, the images of the image sequence of the obstacle 3 are laid one above the other so that the image illustrated in FIG. 3c is retained. It is apparent that when the optical flow of the image sequence is determined and evaluated, at least one striking pixel P is traced. In FIGS. 3a to 3c, two such striking pixels P are marked in each case. Here FIG. 3c shows that such a striking pixel P in the image sequence moves along a flow vector F with a flow vector length. The distance A between the cleaning robot 2 and the obstacle 3 can be determined from this flow vector length with a known velocity v of the cleaning robot 2.

FIG. 2a also shows that a shared end 10 of the close measuring range 6 and the overlap region 9 near to the obstacle is defined by means of a calibration distance 11.

Here this calibration distance 11 is determined by means of the first distance measuring system 5 in measure a). In one case, in which the cleaning robot 2 passes over the end 10 of the close measuring range 6 near to the obstacle and of the overlap region 9 in the direction of the obstacle 3, by introducing measure b), a calibration of the flow vector length with the calibration distance 11 determined by means of the first distance measuring device 5 in measure a) is carried out.

In accordance with the illustrated examples, the second distance measuring system 7 is inactive in measure a). In measure c), the first distance measuring system 5 is inactive. In measure b), both the first and also the second distance measuring system 5, 7 are active. The remote measuring range 4 corresponds for instance to an interval of the distance A between the cleaning robot 2 and obstacle 3 of 30 mm to 200 mm. The close measuring range 6 corresponds for instance to an interval of 0 mm to 50 mm of the distance A between the cleaning robot 2 and obstacle 3.

LIST OF REFERENCE CHARACTERS

1 Method
2 Cleaning robot
3 Obstacle
4 Remote measuring range
5 First distance measuring system
6 Close measuring range
7 Second distance measuring system
8 Camera
9 Overlap region
10 End remote from the obstacle
11 Calibration distance
A Distance
F Flow vector
P Pixel
V Velocity

The invention claimed is:

1. A method for determining a distance between a cleaning robot and an obstacle, the method comprising:
providing the cleaning robot with a first distance measuring system configured to measure the distance in a predetermined remote measuring range and a second distance measuring system with a camera directed onto the obstacle and configured to measure the distance in a predetermined close measuring range;
wherein the close measuring range and the remote measuring range overlap in an overlap region, and wherein each of the first and second distance measuring systems is configured to reliably measure the distance between the cleaning robot and the obstacle within the overlap region;
a) when the obstacle is located within the remote measuring range, determining the distance between the cleaning robot and the obstacle by way of at least the first distance measuring system;
b) when the obstacle is located in the overlap region, determining the distance between the cleaning robot and the obstacle by way of the first and second distance measuring systems; and
c) when the obstacle is located in the close measuring range, determining the distance between the cleaning robot and the obstacle by way of at least the second distance measuring system; and
wherein steps b) and c) comprise determining and evaluating an optical flow of an image sequence detected by the camera of the second distance measuring system in order to determine the distance between the cleaning robot and the obstacle; and wherein the steps of determining and evaluating the optical flow of the image sequence comprise tracing at least one striking pixel which moves in the image sequence along a flow vector with a flow vector length.

2. The method according to claim 1, wherein steps a) and b) comprise determining the distance between the cleaning robot and the obstacle in the remote measuring range by the first distance measuring system using optoelectronic distance measurement.

3. The method according to claim 1, wherein step c) comprises continuously determining and evaluating the optical flow in order to determine the distance between the cleaning robot and the obstacle.

4. The method according to claim 3, wherein step c) comprises assuming a substantially constant velocity of the cleaning robot.

5. The method according to claim 1, wherein a shared end of the close measuring range and the overlap region near to the obstacle is defined by way of a calibration distance, wherein the calibration distance is determined by the first distance measuring system in step a).

6. The method according to claim 5, wherein in one case, in which the cleaning robot passes across an end of the close measuring range near to the obstacle and of the overlap region in a direction towards the obstacle, introducing step b) and carrying out a calibration of the flow vector length with the calibration distance determined by the first distance measuring device in step a).

7. The method according to claim 1, wherein the second distance measuring system is inactive in step a), the first distance measuring system is inactive in step c), and both the first and second distance measuring systems are active in step b).

8. The method according to claim 1, wherein the remote measuring range lies in an interval of 30 mm to 200 mm of the distance between the cleaning robot and the obstacle.

9. The method according to claim 1, wherein the close measuring range lies in an interval of 0 mm to 50 mm of the distance between the cleaning robot and the obstacle.

10. A method for determining a distance between a cleaning robot and an obstacle, the method comprising:
   providing the cleaning robot with a first distance measuring system configured to measure the distance in a predetermined remote measuring range and a second distance measuring system with a camera directed onto the obstacle and configured to measure the distance in a predetermined close measuring range;
   wherein the close measuring range and the remote measuring range overlap in an overlap region, and wherein each of the first and second distance measuring systems is configured to reliably measure the distance between the cleaning robot and the obstacle within the overlap region;
   a) when the obstacle is located within the remote measuring range, determining the distance between the cleaning robot and the obstacle by way of at least the first distance measuring system;
   b) when the obstacle is located in the overlap region, determining the distance between the cleaning robot and the obstacle by way of the first and second distance measuring systems; and
   c) when the obstacle is located in the close measuring range, determining the distance between the cleaning robot and the obstacle by way of at least the second distance measuring system; and
   wherein the second distance measuring system is inactive in step a), the first distance measuring system is inactive in step c), and both the first and second distance measuring systems are active in step b).

* * * * *